US011349757B2

(12) United States Patent
Wang et al.

(10) Patent No.: US 11,349,757 B2
(45) Date of Patent: May 31, 2022

(54) ICN PACKET FORWARDING METHOD

(71) Applicants: INSTITUTE OF ACOUSTICS, CHINESE ACADEMY OF SCIENCES, Beijing (CN); BEIJING HILI TECHNOLOGY CO., LTD, Beijing (CN)

(72) Inventors: Jinlin Wang, Beijing (CN); Jun Chen, Beijing (CN); Gang Cheng, Beijing (CN); Xiaozhou Ye, Beijing (CN); Haojiang Deng, Beijing (CN); Lingfang Wang, Beijing (CN); Weining Qi, Beijing (CN)

(73) Assignees: INSTITUTE OF ACOUSTICS, CHINESE ACADEMY OF SCIENCES, Beijing (CN); BEIJING HILI TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/051,266

(22) PCT Filed: Dec. 17, 2018

(86) PCT No.: PCT/CN2018/121494
§ 371 (c)(1),
(2) Date: Oct. 28, 2020

(87) PCT Pub. No.: WO2019/227902
PCT Pub. Date: Dec. 5, 2019

(65) Prior Publication Data
US 2021/0067443 A1    Mar. 4, 2021

(30) Foreign Application Priority Data
May 28, 2018  (CN) .......................... 201810522656.8

(51) Int. Cl.
H04L 45/74  (2022.01)
H04L 45/00  (2022.01)
(Continued)

(52) U.S. Cl.
CPC .............. *H04L 45/74* (2013.01); *H04L 45/54* (2013.01); *H04L 51/14* (2013.01); *H04L 67/327* (2013.01)

(58) Field of Classification Search
None
See application file for complete search history.

(56) References Cited

U.S. PATENT DOCUMENTS 9,049,251 B2   6/2015  Ravindran et al.
2013/0227166 A1  8/2013  Ravindran et al.
(Continued)

FOREIGN PATENT DOCUMENTS

CN   103369065 A   10/2013
CN   104137509 A   11/2014
(Continued)

OTHER PUBLICATIONS

Mar. 7, 2019 International Search Report issued in International Patent Application No. PCT/CN2018/121494.

*Primary Examiner* — Lonnie V Sweet
(74) *Attorney, Agent, or Firm* — Oliff PLC

(57) ABSTRACT

A ICN packet forwarding method, including: step 1) maintaining, by a network forwarding device, a network entity ID association state table, which is used for recording a state of the binding relationship between a network entity ID and a network address to which the network entity is associatively bound; after a network address binding relationship of the network entity changes due to location movement thereof,
(Continued)

adding or updating, by the network forwarding device, a record of the network entity in the network entity ID association state table according to notification information of the network entity; and step 2) upon receipt of an ICN packet, by the network forwarding device, determining whether the ICN packet needs to be processed, according to information of the current network entity ID association state table; if yes, forwarding after processing the ICN packet; otherwise, directly forwarding the packet.

6 Claims, 2 Drawing Sheets

(51) Int. Cl.
*H04L 51/00* (2022.01)
*H04L 67/63* (2022.01)

(56) References Cited

U.S. PATENT DOCUMENTS

| | | | |
|---|---|---|---|
| 2015/0172413 A1* | 6/2015 | Yoneda | H04L 67/327 709/233 |
| 2016/0087876 A1 | 3/2016 | Fan et al. | |
| 2017/0034055 A1* | 2/2017 | Ravindran | H04L 45/306 |
| 2018/0034905 A1* | 2/2018 | Sato | H04L 67/1065 |
| 2018/0242186 A1* | 8/2018 | Muscariello | H04L 67/2842 |
| 2018/0287940 A1* | 10/2018 | Westphal | H04L 45/745 |
| 2019/0081890 A1* | 3/2019 | Ravindran | H04L 67/327 |
| 2019/0199628 A1* | 6/2019 | Amin | H04L 45/74 |
| 2019/0230167 A1* | 7/2019 | Laari | H04L 61/6059 |
| 2019/0297014 A1* | 9/2019 | Azgin | H04L 45/7453 |
| 2020/0050627 A1* | 2/2020 | Satou | G06F 16/2471 |

FOREIGN PATENT DOCUMENTS

| | | |
|---|---|---|
| CN | 106973013 A | 7/2017 |
| CN | 108063717 A | 5/2018 |
| WO | 2018/006042 A1 | 1/2018 |

* cited by examiner

ICN PACKET FORWARDING METHOD

RELATED APPLICATION

This application claims priority to Chinese patent application No. 201810522656.8, entitled "ICN packet forwarding method," filed on May 28, 2018, which is incorporated herein by reference.

FIELD OF THE INVENTION

The present invention relates to the field of network technology and communication technology, in particular to an ICN packet forwarding method.

BACKGROUND OF THE INVENTION

Movement of a terminal may cause changes of IP addresses in an existing Internet system. Information-centric networking (ICN) has a core concept that the name is separated from the address, and adopts a naming mechanism of ICN, in which each entity in the network obtains a location-independent unique identifier of the entity as its name, and by dynamically binding the name of the entity and the current network address of the entity, the problem of IP address changes during communication may be solved.

A current routing solution that supports hop-by-hop forwarding and binding features after a network address can buffer before forward received packet data, and supports rebinding a network address based on the entity name, in an attempt to achieve an optimum association state between a terminal and a network, so as to better guarantee the service continuity. However, an existing solution lacks timely perception of the movement and change of the location of a network entity and cannot effectively support applications with high requirements on time delay control and service continuity.

SUMMARY OF THE INVENTION

A technical problem to be solved by the present invention is: after a network entity in a communication process changes its current network address due to movement, how to quickly trigger a network device responsible for the routing and forwarding its packet, look up and acquire the current new address after movement of the network entity, and modify a packet address to the new address before forwarding. By timely adjusting the destination address of the packet to be forwarded, the success rate of packet delivery is improved to ensure the continuity of mobile service sessions.

To achieve the above objective, the present invention provides an ICN packet forwarding method, including:

step 1) maintaining, by a network forwarding device, a network entity ID association state table, which is used for recording a state of the binding relationship between a network entity ID and a network address to which the network entity is associatively bound; after a network address binding relationship of the network entity changes due to location movement thereof, adding or updating, by the network forwarding device, a record of the network entity in the network entity ID association state table according to notification information of the network entity; and step 2) upon receipt of an ICN packet, by the network forwarding device, determining whether the ICN packet needs to be processed, according to information of the current network entity ID association state table; if yes, forwarding after processing the ICN packet; otherwise, directly forwarding the packet.

As an improvement of the above-mentioned method, the step 1) specifically includes:

step 101) after the network address binding relationship of the network entity changes due to location movement thereof, acquiring, by the network forwarding device, the notification information of the change of the binding relationship between the network entity and its network address, wherein the notification information at least contains the network entity ID, which is used for identifying a change of the bound network address due to movement of the current location; and step 102) generating, by the network forwarding device, a new record based on the network entity ID carried in the notification information; if there is no record of the network entity in the network entity ID association state table, adding the new record to the network entity ID association state table; if a record related to the ID already exists in the network entity ID association state table, updating the existing record with new record values for this time, wherein the content of each record in the network entity ID association state table includes but is not limited to the network entity ID.

As an improvement of the above-mentioned method, the step 2) specifically includes the following steps:

step 201) acquiring a destination network entity ID from the ICN packet to be forwarded;

step 202) in the network entity ID association state table, looking up an entry record that matches the destination network entity ID; if there is no such entry record, proceeding to step 204); and if there is such an entry record, proceeding to step 203);

step 203) performing pre-processing before forwarding of the ICN packet; and step 204) forwarding, by the network forwarding device, the packet according to the destination network address (NA) in the ICN packet by using a route forwarding mechanism.

As an improvement of the above-mentioned method, the pre-processing before forwarding in the step 203) includes but is not limited to modifying the packet, that is, modifying the destination network address in the ICN packet to a newly bound or other network address value after movement corresponding to the destination network entity ID, acquired from an external system.

As an improvement of the above-mentioned method, the method further includes steps of maintaining the network entity ID association state table, specifically including:

step S1) adding a record to or updating a record in the network entity ID association state table, wherein the content of the record further includes setting a time parameter value related to the current time;

step S2) setting a time parameter value related to the current time for a matched entry record in the network entity ID association state table in the step 202; and step S3) monitoring the time parameter value corresponding to each record in the ID association state table, and for a record in which the time parameter value deviates from the current time by more than a set time threshold, determining the record to be a timeout invalid record, and deleting record from the ID association state table.

As an improvement of the above-mentioned method, the step of maintaining the network entity ID association state table further includes: acquiring specified network entity ID information through a mechanism of receiving an external interface packet, and deleting a record corresponding to the ID from the ID association state table.

The present invention has the following advantages:

In view of the continuity requirement of communication service sessions in mobile scenarios, the present invention discloses a method for triggering pre-processing before forwarding of an ICN packet, in which based on change information of an address binding relationship reflecting entity location movement, and information of the ICN packet, a network entity ID association state table is generated and updated to guide the triggering of a network forwarding device to perform pre-processing before forwarding of the ICN packet, thereby improving the success rate of packet delivery and improving the performance of data service.

DETAILED DESCRIPTION OF THE EMBODIMENTS

Now, the present invention is further described in conjunction with the accompanying drawings.

Figure 1:
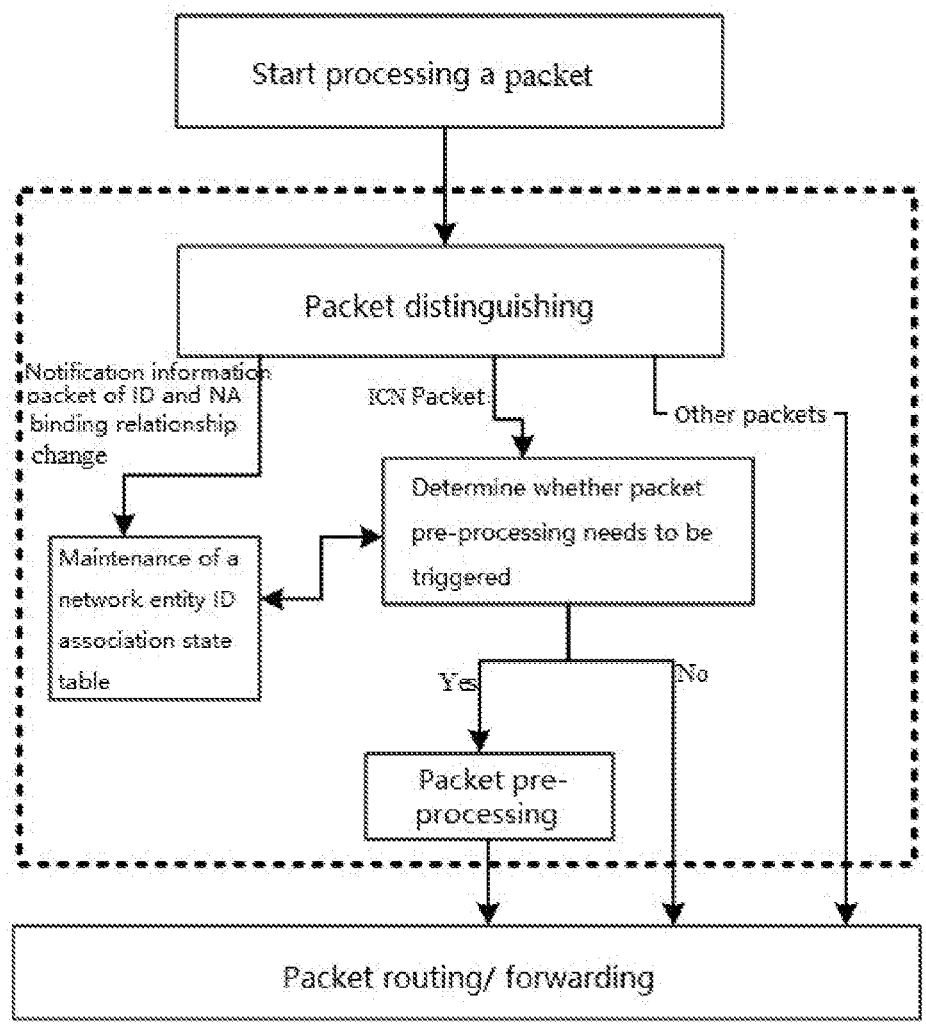
FIG. 1 is a schematic flow diagram of an ICN packet forwarding method of the present invention.

As shown in FIG. 1, in a method of the present invention, a received packet is classified first. If it is a packet carrying notification information of a change of a binding relationship between an network entity and its network address, the information is extracted for maintaining a locally stored ID association state table; and if it is an ICN packet, the information of the above-mentioned ID association state table is used in combination to further determine whether pre-processing is needed before forwarding, and a subsequent processing flow of the packet is triggered according to a result of the determination. If it is a packet other than the packets described above, the packet is forwarded according to an original routing and forwarding mechanism.

The ICN packet has a characteristic that the packet carries both a destination network entity ID and a destination network address NA, and a destination network entity ID value is always kept unchanged during transmission of the packet. The network entity ID refers to information that uniquely identifies a network entity regardless of the network address, including but not limited to using existing identification information of an existing system, or its unidirectional conversion calculation value, or a combination of the above information, etc.; the network address refers to network-routable address information indicating the location of the entity, including but not limited to using an IP addresses, a point of attachment addresses or other information. The time parameter refers to the time when the current record is generated, or the time when the packet, which contains the network entity ID and a bound network address value before movement, was received last time. The encapsulation format of the packet of the notification information of the change of the binding relationship between the network entity and its network address may be either ICN packet encapsulation, or packet encapsulation based on IP or other existing network protocol, and is customized according to an actual implementation requirement.

The maintenance of the local ID association state table mainly includes the following procedures:

(1) Addition of a record in the ID association status table

The notification information of the change of the binding relationship between the network entity and its network address due to movement of the entity's location may be propagated in the form of a packet within the network through an edge network forwarding device. The notification information at least contains the network entity ID, which represents the network entity whose bound network address is changed due to movement of the current location; in addition, the notification information may also or may not include a bound network address NA before movement corresponding to the network entity. The specific packet format, propagation method, and propagation range of the notice information are not limited herein.

Each network forwarding device may perform propagation accordingly to obtain the notification information of the change of the binding relationship between the network entity and its network address, and construct a new record to add to the ID association state table according to a network entity ID value carried therein.

The time parameter of the new record constructed here may be set to a certain amount related to the current time. If the received notification information also contains a bound network address NA value corresponding to the ID before movement, it is used as a bound network address before movement in this new record, otherwise, a specific value is used as the bound network address before movement in this new record.

If a record related to the ID already exists in the ID association state table, then according to the above-mentioned method for generating the values in the new record, all values such as the bound network address before the movement and the time parameter in the ID record are updated and replaced.

(2) Use and update of the ID association state table

Figure 2:
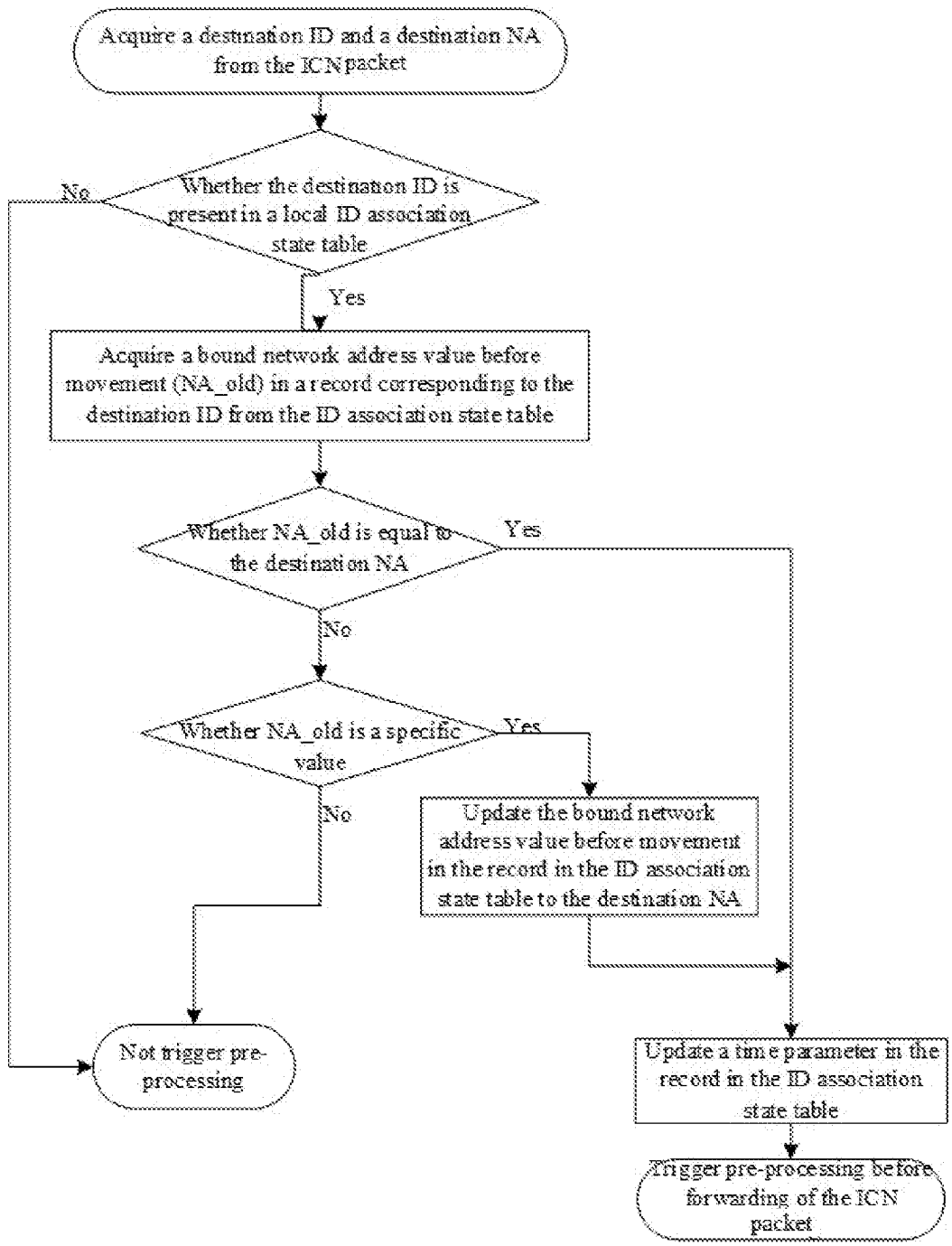
FIG. 2 is a schematic flow diagram of determining whether pre-processing before forwarding of the packet needs to be triggered in the present invention.

The use and update process of the ID association state table is combined with the process of determining whether pre-processing before packet forwarding needs to be triggered. As shown in FIG. 2, the network forwarding device first acquires the destination network entity name ID and the destination network address NA from the current ICN packet to be forwarded, and then, in the locally stored ID association state table, look up a record corresponding to the above-mentioned destination network entity ID. If there is no such record, it indicates that the network address NA bound to the ID has not changed, and the ICN packet can be directly forwarded without triggering pre-processing; and if there is such a record, the bound network address value before movement in the record is acquired from the ID association state table, and further determination is performed according to the following principles:

(a) If the bound network address value before movement is same as the destination network address NA acquired from the current ICN packet to be forwarded, it indicates that the ICN packet just needs triggering of a pre-processing operation before forwarding; meanwhile, the corresponding time parameter in the ID record should be updated to a certain amount related to the current time.

(b) If the bound network address value before movement is a specific value, it indicates that there is no need to match the bound network address value before movement this time, and a pre-processing operation before forwarding should be unconditionally triggered for the ICN packet of the ID; meanwhile, the bound network address value before movement should be changed from the specific value to the destination network address NA acquired from the current ICN packet to be forwarded, and the corresponding time parameter in the ID record should be updated to a certain amount related to the current time.

(c) If the bound network address value before movement is not a specific value and is different from the destination network address NA acquired from the current ICN packet to be forwarded, it indicates that the ICN packet does not need pre-processing before forwarding at the device, and may be forwarded directly.

(3) Deletion of a record in the ID association state table

A record in the table may be deleted through a timeout mechanism. That is, the network forwarding device monitors the time parameter value corresponding to each record in the ID association state table. For a record in which the time parameter value deviates from the current time by more than a set time threshold, it is determined to be a timeout invalid record, and the record is deleted from the ID association state table.

As an improvement of the above method, it is also possible to acquire specified network entity ID information through a mechanism of receiving an external interface packet or the like to delete a record corresponding to the ID from the ID association state table.

(4) Parameter extension of the ID association state table

According to the actual application scenario, the definition and use of a parameter of the ID association state table may be expanded, and the extended parameter is passed when pre-processing before forwarding is triggered for the packet.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions of the technical solutions of the present invention do not depart from the spirit and scope of the technical solutions of the present invention, and should be encompassed within the scope of the claims of the present invention.

The invention claimed is:

1. An Information Centric Network (ICN) message forwarding method, the method comprising:
    step 1) including
        step 100) maintaining, by a network forwarding device, a network entity ID association state table including a plurality of records, the network entity identifier (ID) association state table being used for recording a state of a binding relationship between a network entity ID and a network address to which a network entity is associatively bound;
        step 101) after a network address binding relationship between the network entity and the network address changes due to movement of a current location of the network entity of the network entity,
            acquiring, by the network forwarding device, notification information of a change of the network address binding relationship, the notification information (i) containing the network entity ID and (ii) being used for identifying the change of the network address due to the movement of the current location of the network entity; and
        step 102) generating, by the network forwarding device, a new record based on the network entity ID carried in the notification information such that
            if a record related to the network entity ID does not exist in the network entity ID association state table, the new record is added to the network entity ID association state table, and
            if the record related to the network entity ID exists in the network entity ID association state table, a first network address of the record related to the network entity ID is updated to be a second network address included in the new record; and
    step 2) including
        step 200) receiving, from an external system, an Information Centric Network (ICN) packet to be forwarded, by the network forwarding device, the ICN packet including a destination network entity ID and a destination network address;
        step 201) acquiring the destination network entity ID from the ICN packet to be forwarded;
        step 202) in the network entity ID association state table, looking up an entry record that matches the destination network entity ID and
            if the entry record that matches the destination network entity ID does not exist in the network entity ID association state table, proceeding to step 204), and
            if the entry record that matches the destination network entity ID does exist in the network entity ID association state table, proceeding to step 203);
        step 203) performing pre-processing before forwarding of the ICN packet, the pre-processing including modifying the destination network address in the ICN packet to a newly bound network address after movement corresponding to the destination network entity ID such that when the destination network entity ID is the network entity ID and the destination network address is the first network address, the pre-processing modifies the destination network address of the ICN packet to be the second network address; and
        step 204) forwarding, by the network forwarding device, the ICN packet according to the destination network address in the ICN packet by using a route forwarding mechanism.

2. The ICN message forwarding method according to claim 1, wherein
    content of each record in the network entity ID association state table comprises but is not limited to the network entity ID.

3. The ICN message forwarding method according to claim 2, further comprising:
    step S1) setting a time parameter value related to the current time when adding the new record and updating the record related to the network entity ID in the network entity ID association state table in the step 102);
    step S2) setting the time parameter value related to the current time for a matched entry record in the network entity ID association state table in the step 202); and
    step S3) monitoring the time parameter value corresponding to each record in the network entity ID association state table, and for a record in which the time parameter value deviates from the current time by more than a set time threshold, determining the record to be a timeout invalid record, and deleting the timeout invalid record from the network entity ID association state table.

4. The ICN message forwarding method according to claim 3, further comprising:
    acquiring specified network entity ID information through a mechanism of receiving an external interface packet, and deleting a record corresponding to the acquired specified network entity ID information from the network entity ID association state table.

5. The ICN message forwarding method according to claim 1, further comprising:
- step S1) setting a time parameter value related to the current time when adding the new record and updating the record related to the network entity ID in the network entity ID association state table in the step 102);
- step S2) setting the time parameter value related to the current time for a matched entry record in the network entity ID association state table in the step 202); and
- step S3) monitoring the time parameter value corresponding to each record in the network entity ID association state table, and for a record in which the time parameter value deviates from the current time by more than a set time threshold, determining the record to be a timeout invalid record, and deleting the timeout invalid record from the network entity ID association state table.

6. The ICN message forwarding method according to claim 5, further comprising:
- acquiring specified network entity ID information through a mechanism of receiving an external interface packet, and deleting a record corresponding to the acquired specified network entity ID information from the network entity ID association state table.

* * * * *